(12) United States Patent
Brown et al.

(10) Patent No.: US 11,863,466 B2
(45) Date of Patent: Jan. 2, 2024

(54) CAPACITY FORECASTING FOR HIGH-USAGE PERIODS

(71) Applicant: VMware, Inc., Palo Alto, CA (US)

(72) Inventors: Darren Brown, Seattle, WA (US); Paul Pedersen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/540,288

(22) Filed: Dec. 2, 2021

(65) Prior Publication Data
US 2023/0179539 A1    Jun. 8, 2023

(51) Int. Cl.
| | | |
|---|---|---|
| H04L 47/80 | (2022.01) | |
| H04L 47/74 | (2022.01) | |
| H04L 41/22 | (2022.01) | |
| H04L 47/70 | (2022.01) | |
| H04L 47/78 | (2022.01) | |

(52) U.S. Cl.
CPC .......... H04L 47/808 (2013.01); H04L 41/22 (2013.01); H04L 47/745 (2013.01); H04L 47/781 (2013.01); H04L 47/823 (2013.01)

(58) Field of Classification Search
CPC ... H04L 47/745; H04L 47/781; H04L 47/808; H04L 47/823; H04L 41/22; G06Q 30/0201; G06Q 30/0202; Y04S 20/222; H02J 3/003; G06F 2209/5019
See application file for complete search history.

(56) References Cited

U.S. PATENT DOCUMENTS

| | | | |
|---|---|---|---|
| 10,523,519 B2 * | 12/2019 | Srinivasan | G06F 9/45558 |
| 10,592,169 B2 | 3/2020 | Pedersen | |
| 10,728,121 B1 * | 7/2020 | Chitalia | H04L 41/22 |
| 10,776,166 B2 | 9/2020 | Brown | |
| 10,810,052 B2 | 10/2020 | Brown | |
| 10,984,338 B2 * | 4/2021 | Morris, II | G06N 20/00 |

(Continued)

OTHER PUBLICATIONS

Dang, Xuan Hong, et al. "Incremental and adaptive clustering stream data over sliding window." International Conference on Database and Expert Systems Applications. Springer, Berlin, Heidelberg. (Year: 2009).*

(Continued)

*Primary Examiner* — John M Macilwinen
(74) *Attorney, Agent, or Firm* — Clayton, McKay & Bailey, PC

(57) ABSTRACT

Examples herein include systems and methods for providing capacity forecasting for high-usage periods of a computing infrastructure. An example method can include segmenting a first portion of a data stream and generating a first core set for a forecasting model that predicts future usage of computing resources. The example method can further include segmenting a second portion of the data stream, generating a second core set, and using both core sets to forecast usage. The first core set can then be phased out after a predetermined time period has elapsed such that forecasting is based only on the second core set. The example method can further include defining at least two clusters of data and performing predictive analysis on that specific cluster. Cluster-specific results can be displayed on a GUI, which can also provide a user with options for increase or decrease computing resources based on the predictions.

20 Claims, 7 Drawing Sheets

(56) References Cited

U.S. PATENT DOCUMENTS

| | | | |
|---|---|---|---|
| 2015/0112900 A1* | 4/2015 | Ariyoshi | G06N 20/00 |
| | | | 706/46 |
| 2016/0292578 A1* | 10/2016 | Ashenfelter | G06F 16/248 |
| 2016/0321115 A1* | 11/2016 | Thorpe | G06Q 10/0631 |
| 2018/0176148 A1* | 6/2018 | Ku | H04L 47/823 |
| 2019/0012573 A1* | 1/2019 | Oyamada | G06N 20/00 |
| 2019/0163720 A1* | 5/2019 | Jha | G06Q 10/063 |
| 2019/0250949 A1* | 8/2019 | Chen | H04L 43/0876 |
| 2019/0317817 A1* | 10/2019 | Brown | G06F 9/5077 |
| 2021/0141900 A1 | 5/2021 | Brown | |
| 2021/0144164 A1 | 5/2021 | Mathur | |
| 2021/0271581 A1 | 9/2021 | Mathur | |

OTHER PUBLICATIONS

Deypir, Mahmood, Mohammad Hadi Sadreddini, and Sattar Hashemi. "Towards a variable size sliding window model for frequent itemset mining over data streams." Computers & industrial engineering 63.1: 161-172. (Year: 2012).*

Bifet, Albert, and Ricard Gavalda. "Learning from time-changing data with adaptive windowing." Proceedings of the 2007 SIAM international conference on data mining. Society for Industrial and Applied Mathematics. (Year: 2007).*

Moro, Sérgio, Paulo Cortez, and Paulo Rita. "A data-driven approach to predict the success of bank telemarketing." Decision Support Systems 62: 22-31. (Year: 2014).*

Siami-Namini, Sima, Neda Tavakoli, and Akbar Siami Namin. "A comparison of ARIMA and LSTM in forecasting time series." 2018 17th IEEE international conference on machine learning and applications (ICMLA). IEEE. (Year: 2018).*

Tsymbal, Alexey. "The problem of concept drift: definitions and related work." Computer Science Department, Trinity College Dublin 106.2: 58. (Year: 2004).*

Hill, David J., and Barbara S. Minsker. "Anomaly detection in streaming environmental sensor data: A data-driven modeling approach." Environmental Modelling & Software 25.9: 1014-1022. (Year: 2010).*

Aldhyani, Theyazn HH, and Manish R. Joshi. "An integrated model for prediction of loading packets in network traffic." Proceedings of the Second International Conference on Information and Communication Technology for Competitive Strategies. (Year: 2016).*

Lu. English translation of WO 2020133413A1. (Year: 2020).*

* cited by examiner

CAPACITY FORECASTING FOR HIGH-USAGE PERIODS

BACKGROUND

Information technology ("IT") operations management systems continue to improve, gaining complexity and usefulness for customers. As these systems improve, the analytics associated with these systems grow deeper and more abundant. With respect to using these analytics, some customers find great value in predictive analysis. Predictive analytics can, in theory, predict high or low usage times that will likely occur in the future, indicating to the customer that they will need to dedicate more or fewer resources to their system at during those times.

However, existing solutions face several drawbacks when determining and displaying these analytics. For example, existing solutions to predictive analysis typically reside "offline," such that the analytics engine requires a full data set each time the analysis is to be performed. This prevents a streaming or "online" approach to analytics because the analytics engine cannot easily incorporate new data points as they come in—instead, the engine requires a full data set each time. While some solutions use a streaming approach, they are inefficient because they must store the entire history of data, resulting in an ever-increasing dataset that can strain computational resources.

Furthermore, existing solutions are unable to recognize and isolate certain usage patterns specific to a customer. For example, a banking customer can experience very low system usage overnight and over weekends, but high system usage during certain business hours. Existing solutions typically consider all data points when calculating workloads, averages, or other metrics, which can skew results in a manner that does not reflect real-world usage. For example, a period of high usage followed by a period of low usage my result in an acceptable average usage, but the customer can be more interested in metrics that only analyze the high-usage times. Existing solutions cannot adequately address this issue, especially when using a streaming approach.

Finally, existing solutions do not provide customers with sufficient customizability when desiring analytics relevant to portions or sub-parts of a dataset. Nor do they provide the customer with an efficient way to select certain portions of a dataset to be analyzed and view customized results. These results would allow a customer to make decisions based on the most relevant data and projections.

As a result, a need exists for a capacity-forecasting system that, for example, can efficiently incorporate new data as it arrives, does not require storing large amounts of historical data, automatically identifies relevant portions of the data and allows a user to direct the analysis to those portions, and provides a graphical user interface ("GUI") that efficiently provides these options, as well as options for viewing future forecasts and taking relevant actions within an IT management system.

SUMMARY

Examples described herein include systems and methods for providing capacity forecasting for high-usage periods of a computing infrastructure. An example method can include receiving a data stream associated with computing resources of the computing infrastructure. The data stream can include data indicating usage levels of various computing resources of the computing infrastructure, such as compute, memory, and storage resources. The data stream can include a plurality of data points that reflect resource usage at a point in time or over a period of time.

The example method can also include segmenting a first portion of the data stream and using that portion of data to generate a first core set for a forecasting model. The first core set can be fixed-size buffer, such that it holds a fixed amount of data. The first core set can be populated with data representative of the first portion of the data stream, such that computations using the first core set are less resource intensive than considering all data in the first portion. The example method can further include predicting future usage of one or more computing resources based on the first core set.

The example method can further include segmenting a second portion of the data stream that arrives after the data that was included in the first portion. A second core set for the forecasting model can be generated using the second portion of data. The second core set can be the same fixed size as the first core set. The method can include predicting future usage of one or more computing resources based on both the first and second core sets, rather than just one core set. This overlapping usage of core sets increases the relative importance of newer data—as the second core set uses newer data while the first core set uses both older and newer data—while providing a graceful transition between core sets.

The example method can include phasing out the first core set after a predetermined time period has elapsed. Phasing out can mean, in one example, discarding the first core set such that subsequent predictive analyses are performed using only the second core set. This phasing out process further enhances the importance of relatively newer data.

The example method can further include defining at least two clusters of data based on the first core set. The clusters can be defined by cluster parameters. In some examples, data can be categorized into one of the existing clusters and predictive analysis can be performed on that specific cluster. For example, a data set can be divided into high, medium, and low clusters. The predictive analysis can then be performed on only the high-value cluster, or any other combination of clusters. When a new core set is phased in, it can inherit, or be applied to, any cluster parameters relevant to the previous core set.

The example method can also include displaying the predicted future usage of the computing resources on a GUI. The GUI can allow a user to select between clusters of data, such as high-usage, medium-usage, and low-usage clusters. The GUI can then display the results of predictive analysis for the selected cluster. Alternatively, the GUI can display analyses for multiple clusters at the same time.

In some examples, the GUI can include an option that, when selected by the user, adds or removes computing resources from the computing infrastructure. For example, a predictive analysis for a high-usage cluster can predict that a computing resource will be exhausted within two days. In that example, the GUI can provide the user with an option to increase that computing resource, such as by instantiating a new virtual machine ("VM") in the computing infrastructure.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
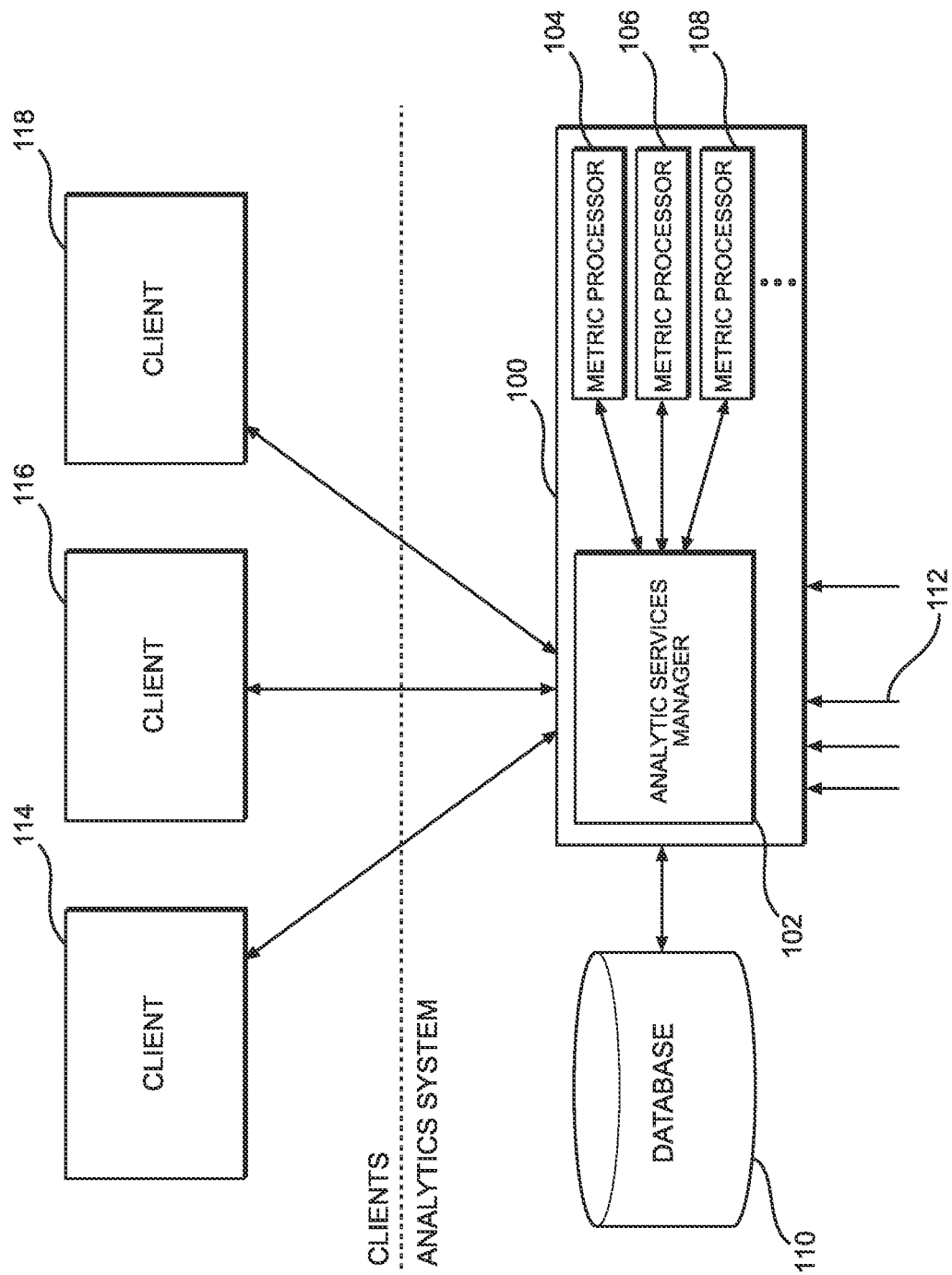
FIG. 1 is an illustration of an analytics system for providing capacity forecasting for high-usage periods of a computing infrastructure.
Figure 2:
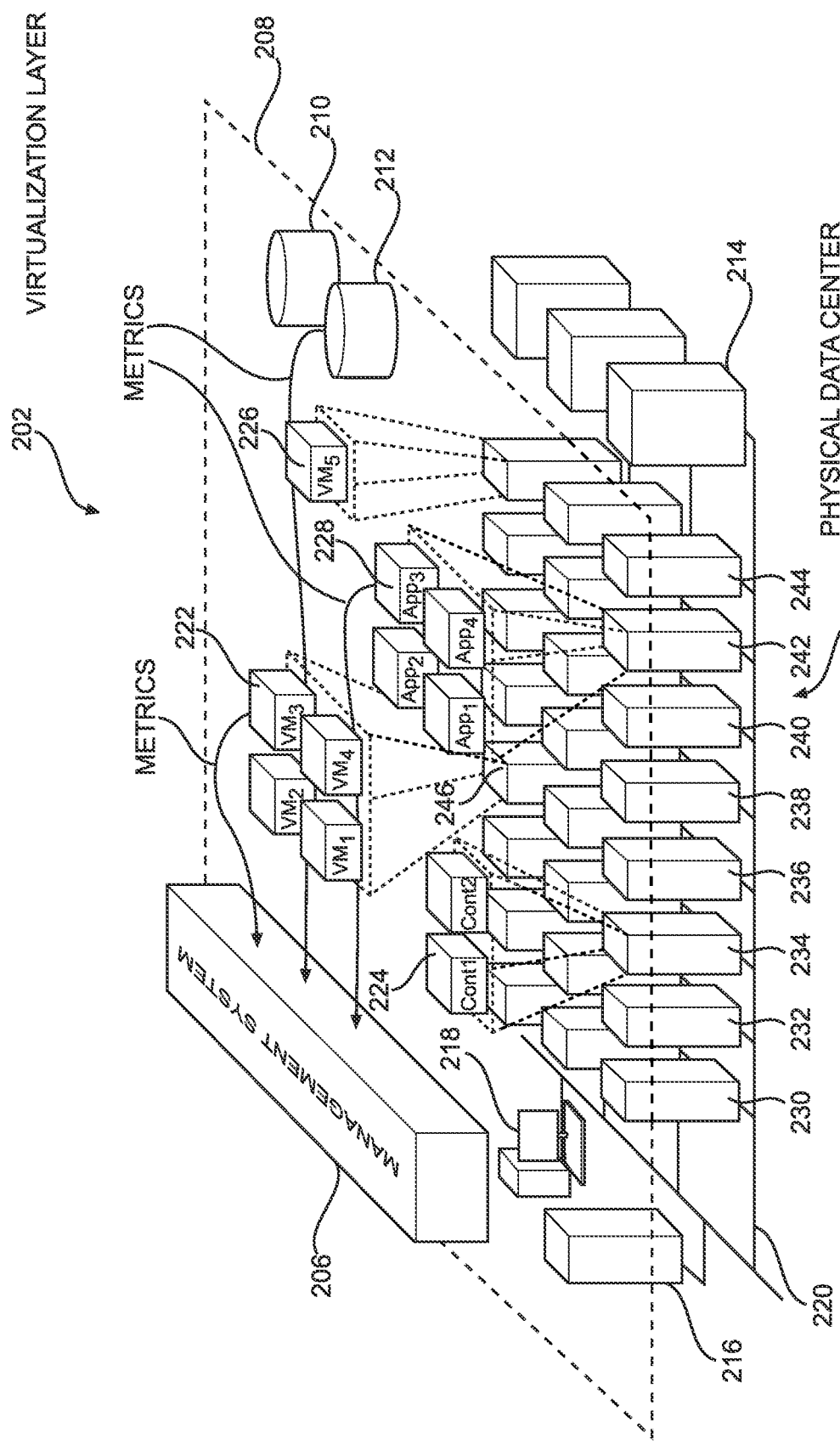
FIG. 2 is an illustration of an analytics system for providing capacity forecasting for high-usage periods of a computing infrastructure.
Figure 3:
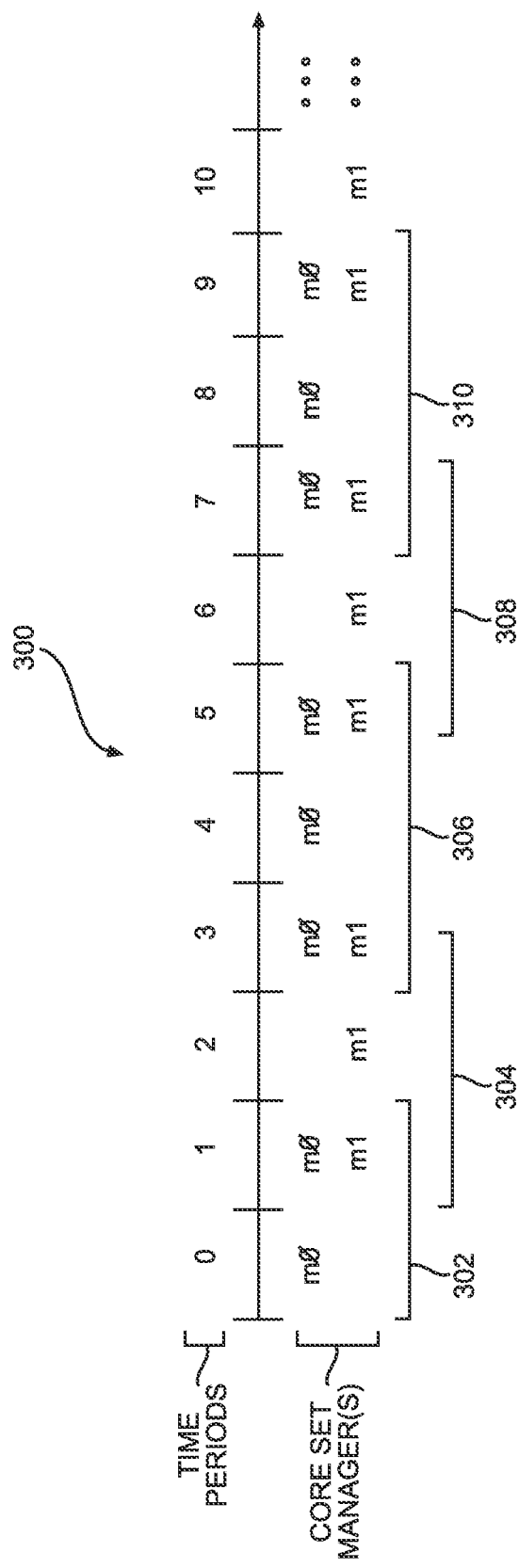
FIG. 3 is an illustrated representation of phasing core set managers for the analytics system.
Figure 4:
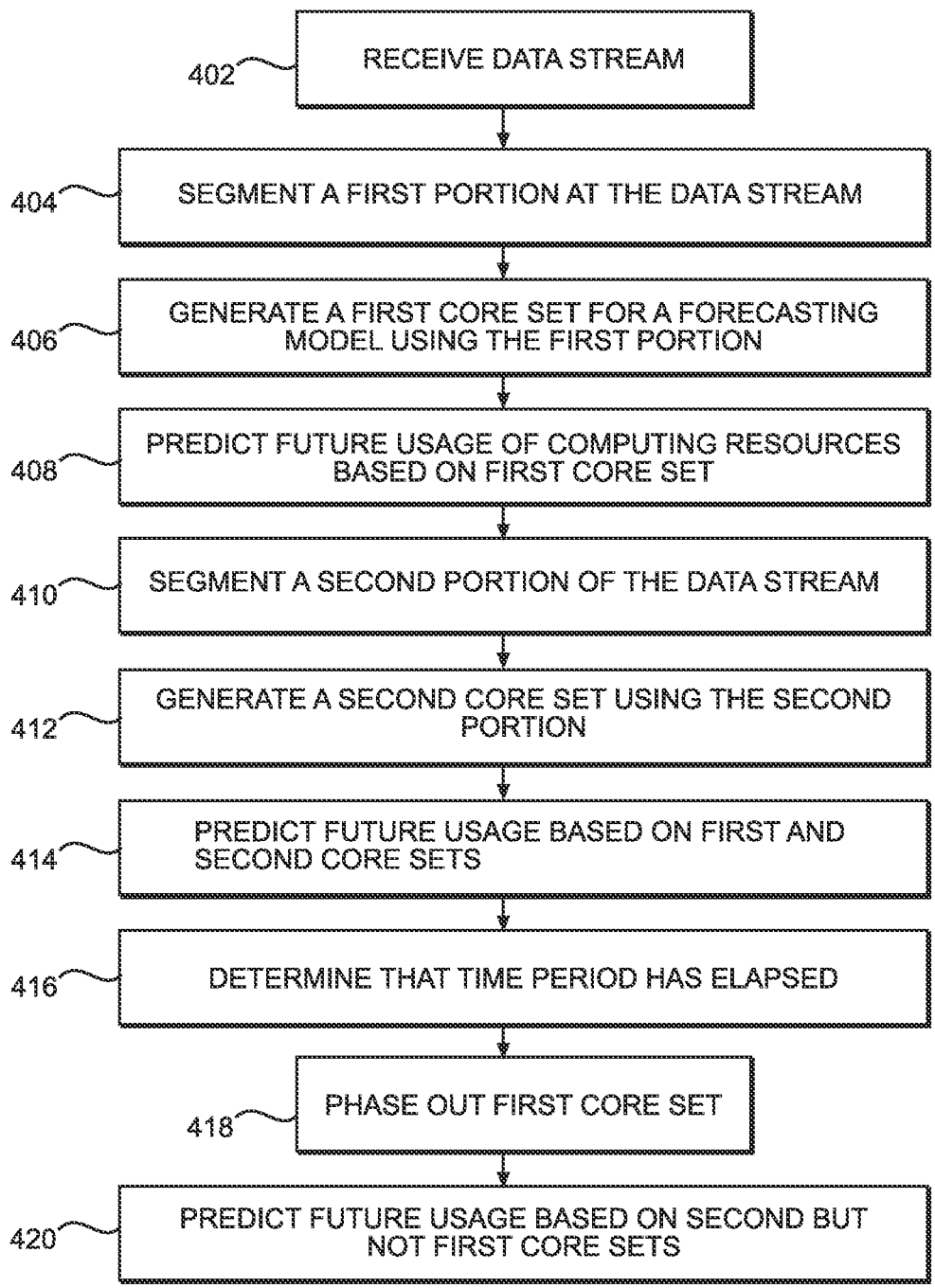
FIG. 4 is a flowchart of an example method for capacity forecasting using core set phasing.
Figure 5:
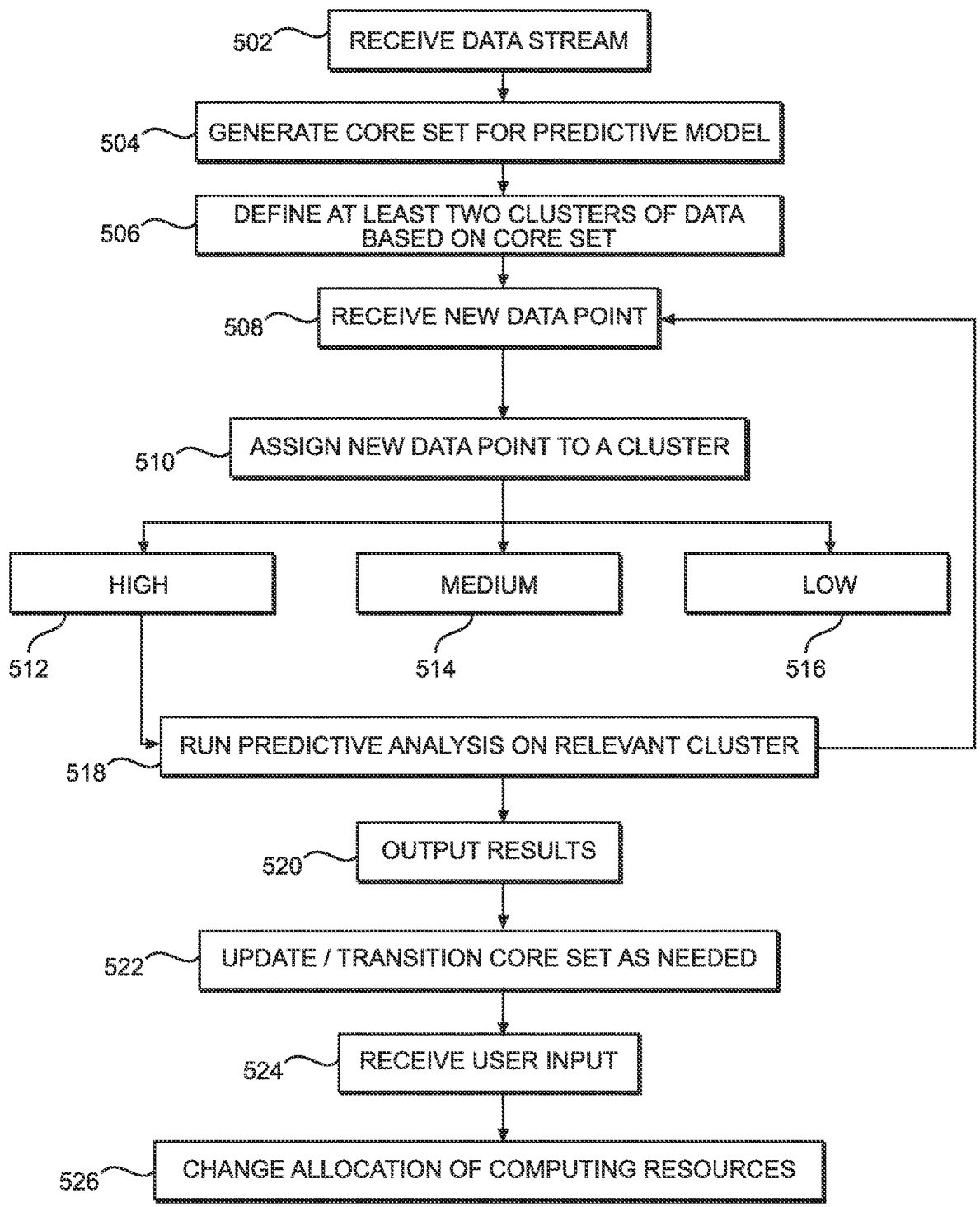
FIG. 5 is a flowchart of an example method for capacity forecasting using streaming data clustering.
Figure 6A:
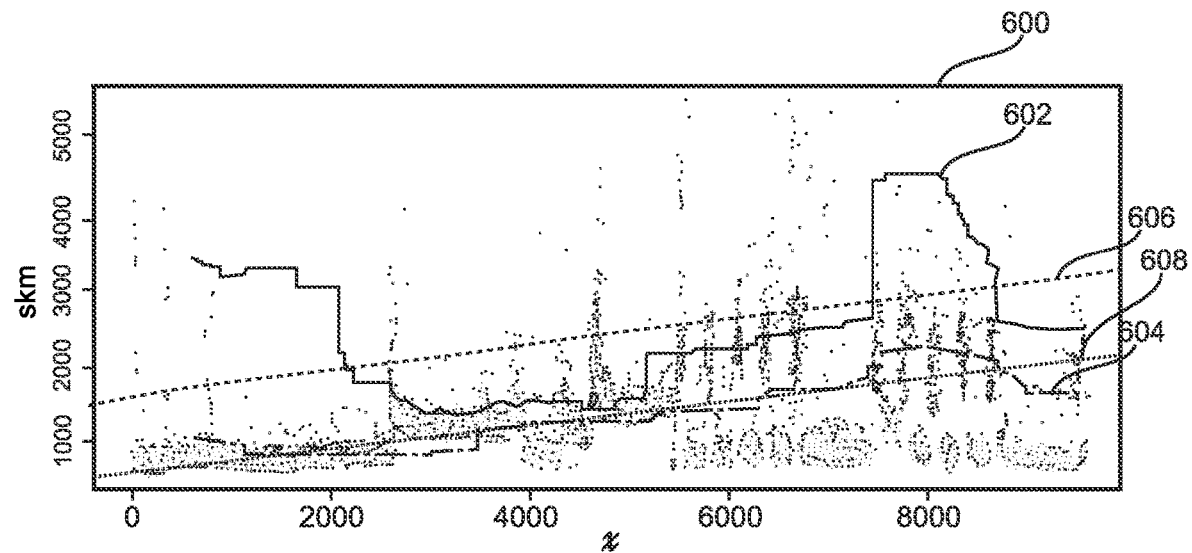
FIG. 6A is an illustration of an example diagram showing a dataset with two cluster-based trend lines.
Figure 6B:
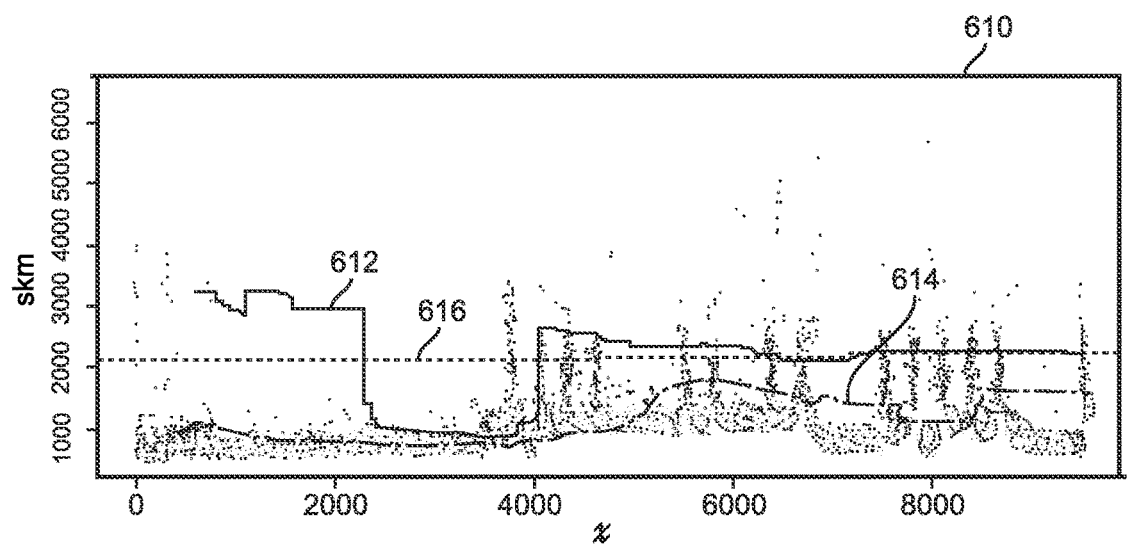
FIG. 6B is an illustration of an example diagram showing a dataset with two cluster-based trend lines.
Figure 7:
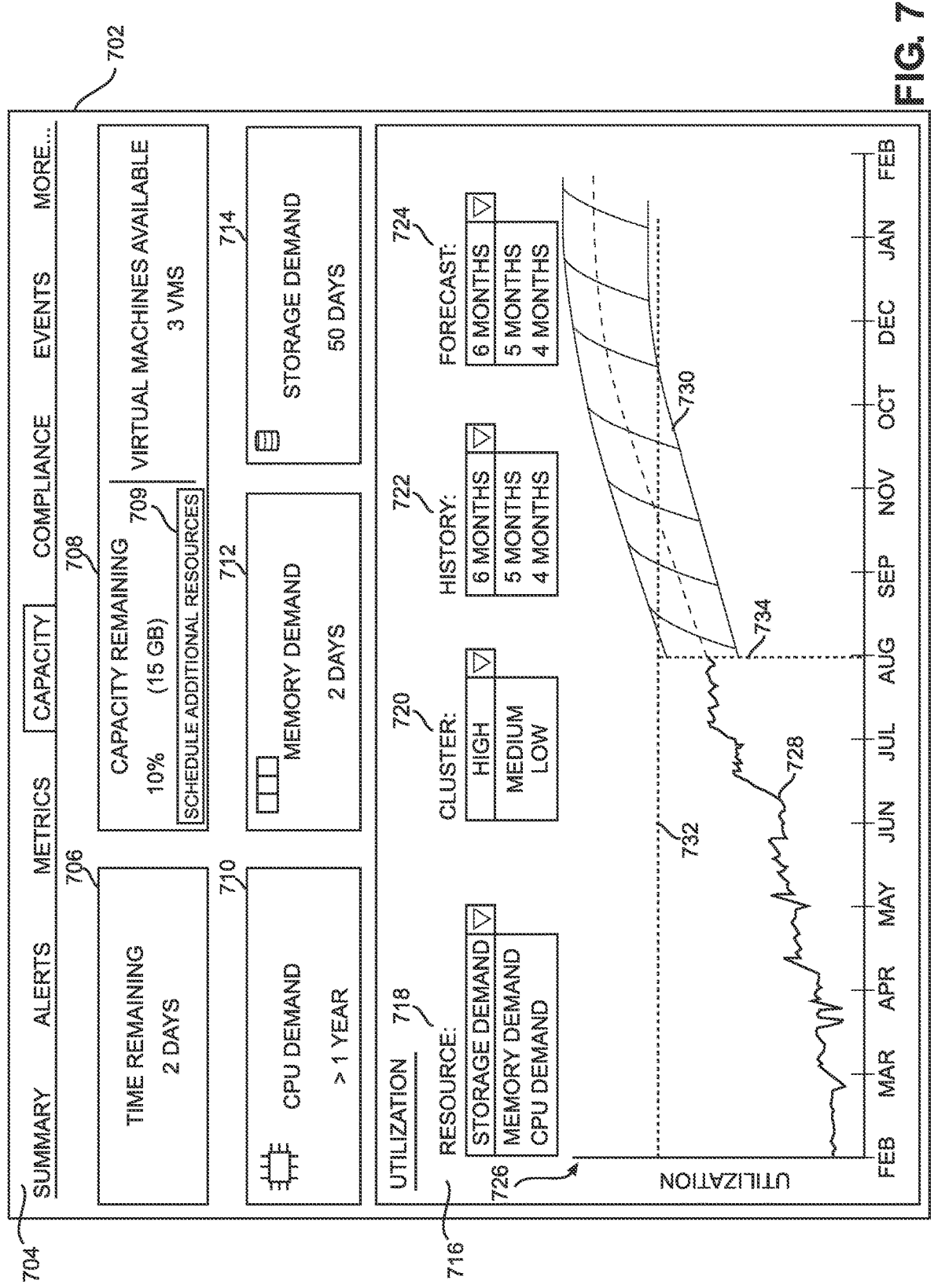
FIG. 7 is an illustration of an example GUI for providing capacity forecasting and taking remedial actions according to one or more methods disclosed herein.

FIGS. 1 and 2 provide illustrations of analytics systems that can carry out the various methods described herein. These drawings and their accompanying descriptions lay out the basic framework of the relevant systems and provide the relevant context for understanding the remaining disclosures herein. FIGS. 3 and 4 relate to a specific implementation of an analytics system, particularly with respect to core sets, core set managers, and methods for phasing in and out core set managers and their associated core sets. FIG. 5 relates to another implementation of an analytics systems, specifically relating to streaming data clustering such that a data stream can be separated into different clusters. FIGS. 6A and 6B illustrate example diagrams of multi-cluster datasets and associated trend lines. FIG. 7 illustrates an example GUI for interacting with one or more of the systems and methods described herein.

FIG. 1 provides an illustration of an analytics system for providing capacity forecasting for high-usage periods of a computing infrastructure. Although this disclosure mentions capacity forecasting for "high-usage" periods, the disclosed capacity forecasting can be applied to various subsets of usage, such as high, medium, or low usage levels. In some examples, the usage levels can be subdivided into ten, twenty, or any other number of levels, and capacity forecasting can be provided for any of those levels or combinations of them. As such, the phrasing regarding "forecasting for high-usage periods" is not intended to limit the examples to only that category of forecasting.

FIG. 1 shows an architecture of an example analytics management system 100 that can execute on one or more servers. The analytics management system 100 includes an analytics services manager 102 and multiple metric processors 104, 106, 108. The analytics management system 100 receives streams of metric data represented by directional arrows, such as directional arrow 112. The analytics management system 100 enables a user to create one or more metric processors 104, 106, 108 from configurable performance models described below and assigns to each metric processor 104, 106, 108 one or more streams of metric data. Each metric processor 104, 106, 108 is registered with a registration key that the analytics services manager 102 uses to route one or more streams of metric data to a corresponding metric processor 104, 106, 108. The analytics services manager 102 can execute on one or more servers of the analytics management system 100. The metric processors 104, 106, 108 can likewise execute on the server(s).

The analytics management system 100 can copy each stream of metric data to a database 110 to create a history for each metric. For example, the history stored in the database 110 can be used to construct core sets for a predictive model as described herein. A core set can be a set of data that approximates a larger data set. In some examples, the core set can be a fixed size and can be updated as new data is added to the overall data set, such that the core set can evolve and remain an accurate approximation of the larger data set. Each metric processor 104, 106, 108 can generate forecast metric data, such as by implementing one or more of the predictive models described herein. The metric processors 104, 106, 108 can also detect anomalous behavior, and provide information and recommendations to a user, such as a data center client 114, 116, 118, application owner, or an IT administrator. The user can elect to take remedial measures or make other changes, which can be carried out by the analytics management system 100. In some examples, the analytics management system 100 can automatically perform remedial measures in response to a notification that anomalous behavior has been detected.

FIG. 2 shows an example of a virtualization layer 202 located above a physical data center 204. For the sake of illustration, the virtualization layer 202 is separated from the physical data center 204 by a virtual-interface plane 208. The physical data center 204 is an example of a distributed computing system or computing infrastructure. The physical data center 204 comprises physical objects, including a management server computer 216, any of various computers, such as PC 218, on which a virtual-data-center ("VDC") management interface can be displayed to system administrators and other users, server computers, such as server computers 230, 232, 234, 236, 238, 240, 242, 244, data-storage devices, and network devices. The server computers 230-244 can be networked together to form networks within the data center 204. The example physical data center 204 includes three networks that each directly interconnects a bank of eight server computers and a mass-storage array. For example, network 220 interconnects server computers 230-244 and a mass-storage array 214.

Different physical data centers can include many different types of computers, networks, data-storage systems, and devices connected according to many different types of connection topologies. The virtualization layer 202 includes virtual objects, such as VMs, applications, and containers, hosted by the server computers in the physical data center 204. The virtualization layer 202 can also include a virtual network (not illustrated) of virtual switches, routers, load balancers, and network interface cards formed from the physical switches, routers, and network interface cards of the physical data center 204. In some examples, server computers can host VMs and containers. For example, server computer 234 hosts two containers 224, server computer 246 hosts four VMs 222, and server computer 248 hosts one VM 226. According to some examples, server computers can host applications. For example, server computer 242 hosts four applications 228. The virtual-interface plane 208 abstracts the resources of the physical data center 204 to one or more VDCs comprising the virtual objects and one or more virtual data stores, such as virtual data stores 210 and 212. For example, one VDC can comprise VMs 222 and virtual data store 210.

As used herein, the term "object" can refer to a physical object or a virtual object which generates streams of metric data associated with components of a computing infrastructure such as the one shown in FIG. 2. A physical object can be a server computer, network device, workstation, desktop computer, laptop computer, or tablet of a distributed computed system, for example. A virtual object can be an application, a VM, a virtual network device, or a container of a distributed computing system. The term "resource" can refer to a physical resource of a distributed computing system, such as, but not limited to, a processor, core, memory, network connection, network interface, data-storage device, mass-storage device, switch, router, and any other component of the physical data center 204. Resources of a server computer and clusters of server computers can form a resource pool for creating virtual resources of a virtual infrastructure used to run virtual objects. The term "resource" can also refer to a virtual resource, which can have been formed from physical resources used by a virtual object. For example, a resource can be a virtual processor formed from one or more cores of a multicore processor, virtual memory formed from a portion of physical memory, virtual storage formed from a sector or image of a hard disk drive, a virtual switch, and a virtual router.

Processes and systems described herein are implemented in a management system that monitors performance of resources and objects of a distributed computing system by collecting one or more streams of time-dependent metric data associated with one or more resources of the computing infrastructure. Each stream of metric data can be time series data generated by a metric source. The metric source can be an operating system of an object, a guest operating system, an object, an application, or a resource. A stream of metric data comprises a sequence of time-ordered metric values that can be recorded at spaced points in time called time stamps. A stream of metric data can also be called a sequence of metric data or simply a "metric."

The streams of metric data include, but are not limited to, CPU usage, amount of memory, network throughput, network traffic, and amount of storage. CPU usage is a measure of CPU time used to process instructions of an application program or operating system as a percentage of CPU capacity. High CPU usage can be an indication of unusually large demand for processing power, such as when an application program enters an infinite loop or when a CPU is processing a heavy workload. Amount of memory is the amount of memory (e.g., GB s) a computer system or other device uses at a given time. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. The streams of metric data can include virtual object metrics, such as error rates, application calls, and response times.

Turning back to FIG. 2, the drawing also shows arrows representing streams of metric data provided to the management system 206 from various components of the computing infrastructure. In some examples, the management system 206 can be the analytics management system 100 shown in FIG. 1 and described above. The management system 206 can be located in the virtualization layer 202 and implemented in one or more VMs to receive and process the various streams of metric data. For example, FIG. 2 shows a directional arrow from virtual data store 212 to the management system 206, where the directional arrow representing a stream of metric data relevant to virtual data store 212. As another example, FIG. 2 shows a directional arrow from VM 222 to the management system 206, where the directional arrow representing a stream of metric data relevant to VM 222. As another example, FIG. 2 shows a directional arrow from application 228 to the management system 206. Although not shown in the drawing, similar data streams can be provided to the management system 206 from other components in the computing infrastructure, such as from mass-storage array 214, management server computer 216, PC 218, and server computers 230, 232, 234, 236, 238, 240, 242, 244, 246. In some examples, these various sources of metric data streams can send metric values as those metric values are generated, while other sources can only send metric values at certain times or in response to a request from the management system 206.

The management system 206 of FIG. 2, which can also include the analytics management system 100 of FIG. 1, can execute one or more predictive algorithms using the various data streams received from components in the computing infrastructure. The system 206 can allow for large-scale, concurrent metric processors that can produce forecasts at any time without requiring preprocessing at the time of forecast. The system 206 can provide a general purpose library that provides real-time, reliable time-series forecasts with configurable models and a small memory footprint. A user can create a metric processor, such as metric processors 104, 106, 108 of FIG. 1, with a set of configurable statistical models to handle an individual time series metric, load metric streams in tuples (timestamp, value), and query for forecast results with confidence intervals as an array of tuples (forecast, upper, lower) starting from the last seen timestamp or any time in the future. The system 206 can cause the metric processors to update all model parameters in a single pass as each timepoint arrives. The system 206 can utilize a subscribe-publish-query pattern. After a metric processor is registered with a resource key in the analytics service, metric timepoints in the form of (resourceKey, timestamp, value) tuples are routed to the corresponding metric processor. An infrastructure tenant can subscribe to a set of metric processors and then can query the metric processor on demand for a forecast of that metric into the future.

In this manner, the system 206 need not store an entire history of datapoints to be reprocessed in the future. Instead, the system 206 can store up-to-date statistics, model parameters, and a short sliding window of metric history. The short sliding window can be defined by one or more core sets that are phased out over time. This phasing-out process allows old data to be discarded to maintain a small footprint for the library. But because the metric processors update their relevant models in response to new data, the discarded data is still reflected in some way by the remaining models. Furthermore, the use of core sets itself allows for a smaller footprint, as the core sets can be constructed with data points that are representative of a larger data set, such that a forecast can be provided based on the representative core set rather than each and every data point over a period of time.

FIG. 3 provides an illustration of a representation 300 of core set swapping, which can be used to phase out older data over time. The illustration shows a timeline with time periods 0 through 10. These time periods can be set to any length of time. In some examples, each period is equivalent to about one month. However, the time periods can represent any time length, including one hour, one day, or one year, as some examples. The illustration also shows core set managers below the timeline. A core set manager can be any type of process that manages a core set, such as by initiating a new core set or discarding an old core set. In this example, there are two core set managers denoted as m0 and m1.

The illustration of FIG. 3 also includes various sections 302, 304, 306, 308, 310 that span multiple time periods and are identified for purposes of describing the core set swapping. Each section can correspond to a lifecycle of a particular core set. For example, section 302 covers time periods 0 and 1, during which time core set manager m0 is active. As shown herein, when a core set manager is active, it is maintaining a core set and updating it with relevant representative data as new data points arrive.

FIG. 3 shows section 304 spanning time periods 1-3, during which a new core set manager m1 is executed. As shown in this example, time period 1 includes overlapping sections 302, 304 which correspond to overlapping core set managers m0, m1, and therefore overlapping core sets. In this example, the older core set (corresponding to section 302) can be based on data occurring in earlier time periods, such as time period 0 and optionally earlier time periods as well. On the other hand, the newer core set (corresponding to section 304) can be based on data occurring in more recent time periods, such as time period 1. In some examples, a newer core set can rely on data from a time period before the first time period in which the core set is utilized. For example, a new core set may be implemented at time period 1, at which point it can be used in forecasting future metrics, but that new core set may rely on some data occurring in the preceding period 0 in order to populate and be usable.

During an overlapping period, such as time period 1, the system can utilize two core sets when forecasting future usage metrics. In some examples, the overlapping core sets will be different from one another and, standing alone, would provide differing forecast results. Rather than immediately jumping from one core set to another, which could result in a sudden change in forecasting results, relying on both core sets for an overlapping period allows the forecasting models to transition more gradually to the new core set without sudden changes in forecasting results.

This overlapping process can continue as shown in FIG. 3. For example, core set manager m1 can manage a core set from time period 1 to time period 3. At time period 3, core set manager m0 can reinitialize and load a new core set. During time period 3, one or more metric processors can utilize both core sets managed by managers m0 and m1. At time period 4, core set manager m1 is terminated and the data from that core set can be discarded. At time period 5, core set manager m1 can be reinitialized with a new core set for overlapping use during time period 5. At time period 6, core set manager m0 can be terminated and the data from that core set can be discarded. At time period 7, core set manager m0 can be reinitialized with a new core set for overlapping use during that time period. At time period 8, core set manager m1 can be terminated and the data from that core set can be discarded. This process can continue into the future indefinitely, such that core sets maintain only recent data and the transitions between older and newer core sets are effected in a smooth manner that provides consistent forecasting results.

Although FIG. 3 describes two core set managers m0 and m1, any number of core set managers can be used. For example, the initialization of a previously terminated core-set-manager process can be considered a new core set manager and can be denoted m2, m3, m4, and so on. Additionally, although only two core sets are shown overlapping at any given time, in some examples more than two core sets can be used simultaneously in an overlapping manner. Furthermore, in some examples core sets can be overlapped for more than one time period or can be disbanded for more than one time period.

FIG. 4 provides a flowchart of an example method for capacity forecasting using core set phasing as described above with respect to FIG. 3. At stage 402, the management system 206 can receive a data stream, such as any of the data streams identified in FIG. 2 provided to the management system 206 from the virtual data store 212, VM 222, application 228, mass-storage array 214, management server computer 216, PC 218, and server computers 230, 232, 234, 236, 238, 240, 242, 244, 246. These data streams are also represented by directional arrows 112 in FIG. 1, for example.

At stage 404, the management system 206 can segment a first portion of the data stream. In some examples, the segmentation at this stage can be performed based on a single data point. In other examples, the segmentation can be performed based on data received after a specific time stamp, where data received prior to that time stamp is segmented differently in association with an older core set. At stage 406, the management system 206 can generate a first core set for a forecasting model using the first portion of the data stream that was segmented at stage 404. Although referred to as the "first" core set, this core set need not actually be the first core set used by the system; instead, the term "first" is used merely to distinguish from other core sets described herein and is not intended to be limiting in any way.

The first core set can be a set of data that is representative of a larger data set. In some examples, the core set is a fixed-sized buffer that contains a fixed amount data. When new data is received, the core set can be updated, if necessary, with a new data point by replacing an existing data point in the core set. In some examples, the core set is a ring buffer with a fixed number of data fields.

At stage 408, the management system 206 can predict future usage of relevant computing resources based on the first core set. In some examples, this prediction can be performed in a streaming fashion, such that each new data point causes a potential update to the core set and associated update to the resulting prediction. More detail regarding the prediction methods and models are provided later in this disclosure.

At stage 410, the management system 206 can segment a second portion of the data stream. The second portion of the data stream can include more-recent data relative to the first portion described above. In some examples, the second portion of the data stream does not share any data points with the first portion of the data stream. At stage 412, the management system 206 can generate a second core set for the forecasting model using the second portion of the data stream that was segmented at stage 410.

At stage 414, the management system 206 can predict future usage of the computing resources based on both the first and second core sets. This stage can correspond to a time period of overlapping core set usage, such as time periods 1, 3, 5, 7, and 9 identified in FIG. 3 and described above. Although the input to the prediction model would increase during these time periods, the overall computational load should remain low based on the fixed-size of the core sets used for the forecasting.

At stage 416, the management system 206 can determine that a relevant time period has elapsed, such as time period 1 illustrated in FIG. 3. At stage 418, the management system 206 can phase out the first core set. This can include terminating the relevant core set manager, such as core set manager m0 in FIG. 3, which is shown being used during time period 1 but not time period 2. The method can then continue to stage 420, which can include predicting future resource usage based on the second core set but not the first core set. For example, at time period 2 in FIG. 3, only core set manager m1 is active and maintaining a core set for forecasting use. This method can therefore gracefully transition between old and new core sets, maintaining fresh data in a lightweight format to promote low resource usage while discarding old data.

As mentioned in the background section of this disclosure, some tenants of a computing infrastructure would find value in recognizing and isolating certain usage patterns specific to their business, as well as forecasting values for an isolated portion of that pattern. As an example, a tenant can experience distinct high and low usage periods in their business. The tenant might be interested in forecasting only the high usage periods in an example. That tenant would be less interested in forecasts that average the high and low usage periods, instead preferring to forecast the high usage periods specifically while excluding the low usage periods. FIG. 5 provides a flowchart of an example method for capacity forecasting using streaming data clustering to accomplish these goals.

At stage 502, the management system 206 can receive a data stream, such as any of the data streams identified in FIG. 2 provided to the management system 206 from the virtual data store 212, VM 222, application 228, mass-storage array 214, management server computer 216, PC 218, and server computers 230, 232, 234, 236, 238, 240, 242, 244, 246. These data streams are also represented by directional arrows 112 in FIG. 1, for example.

At stage 504, the management system 206 can generate a core set for a predictive model. This can include segmenting a portion of the data stream and generating a core set based on that segmented portion, as described with respect to stages 404 and 406 of. FIG. 4. At stage 506, the management system 206 can define at least two clusters of data. In some examples, this stage is performed based on the core set itself, while in other stages a larger set of data is utilized. Additional detail on the clustering mechanism is provided later in this disclosure.

With the at least two clusters defined, the management system 206 can place new data into one of those clusters. For example, at stage 508 the management system 206 can receive a new data point, and at stage 510 that data point can be assigned to one of the clusters defined at stage 506. In some examples, this stage includes updating the core set with a new data point, although this updating can be performed later as part of stage 522. In the example of FIG. the new data point can be assigned to one of three clusters. In particular, it can be assigned to a high-usage cluster at stage 512, a medium-usage cluster at stage 514, or a low-usage cluster at stage 516. These clusters are exemplary only, and the number of clusters can be used based on the data or the needs of the tenant. In this example, the data point is added to the high-usage cluster at stage 512.

At stage 518, management system 206 can run a predictive analysis on the updated cluster, which in this example is the high-usage cluster. The predictive analysis can be limited to the relevant cluster and can incorporate the new data point assigned at stage 510. The predictive analysis at this stage can be specific to a computing resource, such as CPU, memory, or storage resources, or it can include multiple resources. Results of the predictive analysis can be output at stage 520, such as by displaying a trend line or prediction line on a graph of a GUI. This can allow, for example, a tenant to visualize a predicted resource usage specific to a particular usage cluster. In other words, in this example, the tenant can visualize expected changes in the high-usage workload periods.

At stage 522, the management system 206 can update or transition the core set as needed. For example, the management system 206 can replace an entry in the core set with the new data point received at stage 508. As mentioned above, this replacement can also occur before the predictive analysis is run, such as at stage 510. In another example, the management system 206 can transition the core set, such as by initiating a new core set manager or retiring an existing core set manager, as explained with respect to FIG. 3.

At stage 524, the management system 206 can receive user input regarding taking an action based on the results output at stage 520. For example, and as described in more detail with respect to FIG. 7, the GUI that displays results can warn the user that a particular resource is expected to fall below a particular threshold within a period of time. This can include, for example, a warning message that storage capacity is expected to be reached within two days. In an example, the GUI can provide an option for the user to change a resource allocation associated with that resource. In the example of storage capacity exceeding a limit, the GUI can prompt the user to allocate greater storage capacity to their resource allocation. The user can provide input to that prompt as part of stage 524, and the management system 206 can carry out the allocation change, or any other relevant change, at stage 526.

With respect to forecasting for specific clusters, in one example, the management system 206 can utilize a streaming mixed gaussian optimized approach. This can be implemented, at least in part, by the following code:

```
public void init(double[ ] w) {
    int n = w.length;
    // initialize K random centers (means)
    Random rand = new Random( );
    for (int r = 0; r < K; r++) mu[r] = w[rand.nextInt(n)];
    // Note: initial centers could be set by running fast k-means
    pass over the data.
    // compute sub-sample variance
    // ybar = 1/n * Σᵢyᵢ
    double ybar = 0;
    for (int i=0; i<n; i++) ybar += w[i];
    ybar /= n;
    // initialize with subsample variance
    double s2 = 0;
    for (int i=0; i<n; i++) {
        double z = (w[i] - ybar);
        s2 += z*z;
    }
    s2 /= n;
    for (int r=0; r<K; r++) sigma2[r] = s2;
    // initialize weights: set all equal to 1/K
    for (int r=0; r<K; r++) pi[r] = 1.0 / (double)K;
    if (DEBUGGING) {
```

```
            System.out.println("Initialization:");
            System.out.println(" N = "+N);
            System.out.println(" K = "+K);
            for (int r=0;r<K;r++) {
                System.out.println(      " μ["+r+"] = "+mu[r] +
                                   ", σ²["+r+"] = "+sigma2[r] +
                                   ", π["+r+"] = "+pi[r]);
            }
        }
    }
```

For each data load, the following code can be applied, which reflects batches swapping out with each other to allow for pseudo-streaming behavior:

```
    public void load(double Y) {
        // System.out.print("-");
        oy.add(y);
        if (N<WARMUP) {
            warmBuf[N++] = y;
            return;
        }
        if (N==WARMUP) {
            init(warmBuf);
            N++;
            for (int r=0; r<K; r++) {
                omu[r] = mu[r];
                osigma2[r] = sigma2[r] * N;
            }
        }
        // Expectation step: r-h center, i-th sample, θ_r = (μ_r,σ_r²)
        // y_r = π_r*φ[θ_r](y_i) / Σ_v π_v*φ[θ_v](y_i), where Σ_v π_r = 1
        double z = 0; //normalization
        for (int r=0; r<K; r++) {
            z += pi[r]*phi(mu[r], sigma2[r], y);
        }
        for (int r=0; r<K; r++) {
            double x = phi(mu[r], sigma2[r], y);
            ogamma[r] = pi[r]*x / z;
        }
    if (!DECAY) {
        for (int q = 0; q<10; q++) {
            for (int r=0; r<K; r++) {
                g[r] += ogamma[r];
            }
            for (int r=0; r<K; r++) {
                omu[r] += ogamma[r]*Y;
                mu[r] = omu[r] / g[r];
            }
            for (int r=0; r<K; r++) {
                z = (y-mu[r]);
                osigma2[r] += ogamma[r]*z*z;
                sigma2[r] = osigma2[r] / g[r];
            }
            z = 0;
            for (int r=0; r<K; r++) {
                z += g[r];
            }
            for (int r=0; r<K; r++) {
                opi[r] += g[r];
                pi[r] = opi[r] / z;
            }
        }
    } else { //DECAY
        for (int r=0; r<K; r++) {
            g[r] *= decayLambda;
            g[r] += ogamma[r];
        }
        for (int r=0; r<K; r++) {
            omu[r] = decayLambda*omu[r] + ogamma[r]*y;
            mu[r] = omu[r] / g[r];
        }
        for (int r=0; r<K; r++) {
            z = (y-mu[r]);
            osigma2[r] = decayLambda*osigma2[r] + ogamma[r]*z*z;
            sigma2[r] = osigma2[r] / g[r];
        }
        z = 0;
        for (int r=0; r<K; r++) {
            z += g[r];
        }
        for (int r=0; r<K; r++) {
            opi[r] += g[r];
            pi[r] = opi[r] / z;
        }
    }
    // check affinity
    double maxVal = Double.MIN_VALUE;
    int maxIndex = -1;
    for (int r=0; r<K; r++) {
        if (ogamma[r] > maxVal) {
            maxVal = ogamma[r];
            maxIndex = r;
        }
    }
    oaff.add(maxIndex);
}
```

In another example, the management system 206 can utilize an incremental k-means approach. When a new data point is loaded, the system can determine the core set, as shown with the example code below:

```
    public void load(double x) {
        if (!init) {
            init( );
        }
        buf.add(x);
        // initial fill : continue loading.
        // if (buf.size( ) < buf.capacity( )) return;
        // new minibatch not yet complete : continue loading
        if (++batchCounter < batchFrequency) return;
        batchCounter = 0;
        // new minibatch : compute model
        cluster(buf.getArray( ));
        clusters.clear( );
        for (int i = 0; i< clusterCount; i++) {
            if (countv[i] > 0) {
                Cluster c = new Cluster(countv[i], muv[i], sigma2v[i]);
                clusters.add(c);
            }
        }
        // sort prior and new before comparing
        Collections.sort(clusters);
        if (DEBUGGING) {
            MSG( m: "New clusters:");
            for (int i = 0; i< clusters.size( ); i++) {
                MSG( m: "["+i+"] = "+ clusters.get(i)
            }
        }
    }
```

In another example, the management system 206 can utilize a streaming k-means++ approach, where a new data point is added, the core set is calculated incrementally, and the membership of the core set is established. This allows for two separate core sets to be maintained at any given time, one being built up from scratch while the other is established and being used by the model. After a period of time, the model under use is replaced with the newly trained model and a new model is created. This strategy can put a limit on the amount of memory and CPU that any particular model is using. The below approach operates with the models overlapping in less of a binary fashion:

```
    if (0 == (1+ ticks) % regime) {
        int nBlock = (1+ ticks) / regime;
        if (0 == nBlock%2) {         //even: switch
            if (manager0_!= null) {
```

-continued

```
        manager = manager0_;
        manager0_ = null;
    }
} else if (1==nBlock%2) {        // odd: allocate
    manager0_ = new BucketManager(buckets, dim, coresetSize,
    seed);
    }
}
// load the point, tick the clock
Point p = new Point((float) v, ticks++);
manager.insertPoint(p);
if (ticks >= warmup)
    status = ForecastStatusEnum.STABLE_FORECAST;
// if swap manager has been allocated, start warming it up
    if (manager0_ !=null) manager0.insertPoint(p);
    Relatedly, the example code provided below can be used to rebuild
    a core set:
// each 'refresh' ticks we recompute coreset kMeans++
if (0 == (1+ ticks) % refresh) {
    ArrayList<Point> coreset = buildManagerCoreset( );
    // compute QUORUM clusterings with kMeans++, and take the
best
    float minCost = 0.0f;
    float curCost = 0.0f;
    CoresetCostTriple triple =
        lloydPlusPlus(clusters, this.coresetSize, dim, coreset);
    if (triple!=null) {
        minCost = triple.getCoresetCost( );
        for (int j = 0; j< clusters; j++) {
            //corsetCenters[j] = triple.getCoresetCenters( )[j].clone( );
        }
        curCost = minCost;
        CoresetCostTriple oldTriple = triple;
        for (int i = 1; i< quorum; i++) {
            triple = lloydPlusPlus(clusters, this.coresetSize, dim, coreset);
            if (triple==null) {
                triple = oldTriple;
                break;
            }
            curCost = triple.getCoresetCost( );
            if (curCost < minCost)
                minCost = curCost;
                for (int j = 0; i < clusters; j++) {
                    //coresetCenters[j] = triple.getCoresetCenters( )[j].clone( );
                }
            }
        }
        triple.sort( );
    }
}
```

Next, the example code below can be used to calculate a high-use cluster center and run that through a linear model. For each cluster, the code can determine its center and store that center for each dimension. Then, for all of the centers in each cluster, the data is smoothed and the highest value cluster is passed through a linear model in order to device a forecast for the highest demand.

```
if (triple!=null) {
    float[ ] centers = new float[clusters];
    for (int i=0; i< clusters; i++ {
        Point q = triple.getCoresetCenters( )[i];
        centers[i] = q.cc( );
    }
    // Add centers to smoothing buffers
    for (int i = 0; i< clusters; i++) {
        datav[i].add(centers[i]);
    }
    // Add top cluster radius to smoothing buffer
    radius.add(triple.getRadii( )[clusters -1]);
    // Load smoothed high value center to linear model.
    RingBuffer b1 = datav[clusters -1];
    float z= (b1.isFilled( ) ? b1.median( ) : b1.avg( ));
    for (int r=0; r<refresh; r++) lm.load(z);
```

This disclosure therefore provides multiple approaches to modeling high-demand data.

FIG. 6A is an illustration of an example graph 600 showing a dataset that includes various data points presented in a scatter-plot format. In this example, the data has been analyzed with two potential clusters, which can be considered "high" and "low." A first line 602 generally defines the high cluster while a second line 604 generally defines the low cluster. Additionally, a first trend line 606 is fit to the first line 602 associated with the high cluster, while a second trend line 608 is fit to the second line 604 associated with the low cluster. The trend lines 606, 608 can be used to project future resource usage. In this example, both trend lines 606, 608 are trending upwards. These trend lines 606, 608 can be extrapolated into the future to provide predictions, such as in the format shown in FIG. 7.

FIG. 6B provides an illustration of another example graph 610 showing a different dataset that includes various data points presented in a scatter-plot format. In this example, the data has been analyzed with two potential clusters, which can be considered "high" and "low." A first line 612 generally defines the high cluster while a second line 614 generally defines the low cluster. Additionally, a first trend line 616 is fit to the first line 612 associated with the high cluster. The trend lines 616 can be used to project future resource usage. In this example, the trend line 616 is trending flat. This can be extrapolated into the future to provide predictions, such as in the format shown in FIG. 7.

FIG. 7 provides an illustration of an example GUI 702 for providing capacity forecasting and taking remedial actions according to one or more methods disclosed herein. The GUI 702 can be generated by the management system 206 and can reflect various metrics received from components of the computing infrastructure, as described with respect to FIGS. 1 and 2. The GUI 702 can be hosted on the management server computer 216 in some examples. In other examples, the GUI 702 is hosted in a VM instantiated on a server computer in the computing infrastructure. In this example, the GUI 702 is intended to reflect an interface that can be provided to a tenant of the computing infrastructure. For example, an IT administrator at a tenant company can view this GUI 702 to determine resource capacity usage and forecasts, and to make appropriate changes.

The GUI 702 includes a menu bar 704 that provides various options. In this example, the menu bar 704 includes options for Summary, Alerts, Metrics, Capacity, Compliance, Events, and More. Menu bar 704 shows a box surrounding Capacity, indicating that the GUI 702 is displaying a page in response to a user selection of the Capacity tab. In some examples, the GUI 702 can be displayed in the Metrics tab or in another tab not shown, such as a Forecasts tab.

The GUI 702 includes various informational boxes that provide useful metric forecasting information to a user. For example, a time remaining box 706 provides a high-level warning to the user regarding how much time is remaining before a computing resource is forecasted to fall below a relevant threshold. In this example, the time remaining box 706 shows "2 days," meaning that the metric forecasting model predicts that a computing resource is forecasted to fall below a threshold within about 2 days. The threshold can be set elsewhere, such as in the Metrics or Compliance tabs in the menu bar 704.

The GUI 702 also includes several informational boxes showing time remaining for each of the computing resources. For example, a CPU Demand box 710 shows that CPU demand is expected to remain within acceptable levels for over 1 year. A Memory Demand box 712 shows that memory demand is expected to remain within acceptable levels for about 2 days. And a Storage Demand box 714 shows that storage demand is expected to remain within acceptable levels for about 50 days.

The GUI 702 also includes a capacity details box 708, which has a Capacity Remaining section showing that only 10% capacity is currently remaining. The capacity details box 708 also shows that 3 VMs are available. Finally, the capacity details box 708 includes a selectable graphical element 709 for scheduling additional resources. In some examples, a user can select element 709 to provision more resources from the computing infrastructure, as explained above with respect to stages 524 and 526 of FIG. 5. For example, selecting element 709 can cause the management system 206 to automatically request and provision additional computing resources. In that example, the management system 206 can provision an amount of resources necessary to return the remaining capacity to above a threshold of some sort. As one example, resources can be provisioned such that remaining capacity is above 25%. In another example, resources can be provisioned such that remaining capacity provides a time remaining of at least 3 months. Any other thresholds can be used, and in some examples these thresholds can be customized or otherwise changed through other tabs in the menu bar 704.

In some examples, selecting element 709 can allow a user to make more granular decisions regarding scheduling additional resources, such as by displaying a GUI window or a new GUI page that includes relevant options. Regardless of whether the resulting display is a window within the current GUI page or a new page, the user can be presented with options for increasing or decreasing computing resources. For example, the user can select to instantiate one or more VMs. In another example, the user can select an increased amount of memory, CPU, or storage resources, and the management system 206 can provision the resources appropriately, such as by instantiating the required number of VMs. The user or management system 206 can also select the type of VMs, such as a VM provisioned with more memory than another VM which may be provisioned with more storage.

The GUI 702 also includes a utilization section 716 that provides a graph 726 as well as selectable options for the graph. A resource field 718 can allow a user to select between various resources, such as storage demand, CPU demand, and memory demand. In this example, the user has selected storage demand using the resource field 718. Similarly, a cluster field 720 is provided, allowing a user to select from multiple clusters available for the data. As explained above with respect to FIGS. 5, 6A, and 6B, the relevant data can be separated into two or more clusters. In the example of FIG. 7, the data has been separated into high-, medium-, and low-usage clusters, with the high-usage cluster being selected in the cluster field 720. In some examples, the selection in this field can cause the management system 206 to update relevant values in the information boxes above, such as by updating the time remaining, capacity remaining, or resource demand relevant to a particular cluster. As an example, the capacity remaining can be 10% when considering high-usage data, but 50% when considering medium-usage data. In some examples, the informational boxes in the GUI 702 relate to the highest-usage cluster by default, although the default setting could be modified by the user.

The GUI 702 also includes a history field 722 that can be used to select the length of history shown in the graph 726 below the field 722. In this example, the history field 722 provides options for 6 months, 5 months, or 4 months, although any other period of time could be included here. In this example the user has selected 6 months of history using the history field 722, which is reflected in the graph 726 below which shows a history of storage demand from February to August.

Similarly, the GUI 702 includes a forecast field 724 that can be used to select the length of a forecast shown in the graph 726 below the field 724. In this example, the forecast field 724 provides options for 6 months, 5 months, or 4 months, although any other period of time could be included here. In this example the user has selected 6 months of forecast using the forecast field 724, which is reflected in the graph 726 below which shows a forecast of storage demand from August through February of the following year.

The graph 726 itself includes a usage line 728 that tracks the historical resource usage of the resource selected in the resource field 718. Although not shown, the graph 726 can include labels along the y-axis that denote specific usage levels that can be used to interpret the data on the graph 726. The graph 726 also includes a line 734 marking the present day, such that the data line to the left of that line 734 reflects historical data while the data line(s) to the right reflects projections into the future.

In this example, the graph 726 includes a projection 730 beginning at line 734 and extending six months into the future. The projection 730 includes a dotted line that reflects the projection itself, along with upper and lower bounds reflecting a confidence level. A user can select or alter the confidence level through settings not shown in this drawing. The projection 730 can be compared against a threshold line 732, which can indicate when the projected usage is expected to cross a relevant threshold. In this example, the storage demand projection 730 is expected to exceed the threshold line 732 in about 50 days. This time period is also reflected in the storage demand box 714 of the GUI 702, as discussed above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing resources of a computing infrastructure, comprising:
   receiving a data stream associated with computing resources of the computing infrastructure;
   generating a first core set for a forecasting model using a first portion of the data stream;
   predicting future usage of the computing resources based on the first core set;
   generating a second core set for the forecasting model using a second portion of the data stream, the second portion being newer than the first portion and not including data from the first portion, wherein the second core set is generated using an approach that is one of a mixed gaussian, incremental k-means, streaming k-means++;

predicting future usage of the computing resources based on both the first and second core sets, wherein the first and second core sets correspond to two different overlapping time windows with non-overlapping data, wherein both the first and second core sets are used in the predicting at a time when the two different time windows overlap;

after a predetermined time period has elapsed, discarding the first core set;

predicting future usage of the computing resources based on the second core set but not the first core set; and displaying the predicted future usage of the computing resources on a graphical user interface (GUI).

2. The method of claim 1, wherein the first and second core sets are each a fixed-size buffer.

3. The method of claim 1, further comprising in response to a user selecting an option on the GUI, adding or removing computing resources from the computing infrastructure.

4. The method of claim 1, further comprising defining at least two clusters of data based on the first core set, the at least two clusters defined by cluster parameters.

5. The method of claim 4, further comprising causing the second core set to inherent the cluster parameters associated with the first core set.

6. The method of claim 4, wherein displaying the predicted future usage comprises displaying a predicted future usage for each of the at least two clusters.

7. The method of claim 4, further comprising displaying, on the GUI, a graphical element allowing a user to select between the at least two clusters for display of the selected cluster and a predicted future usage associated with that cluster.

8. A non-transitory, computer-readable medium containing instructions that, when executed by a hardware-based processor, performs stages for managing resources of a computing infrastructure, the stages comprising:

receiving a data stream associated with computing resources of the computing infrastructure;

generating a first core set for a forecasting model using a first portion of the data stream;

predicting future usage of the computing resources based on the first core set;

generating a second core set for the forecasting model using a second portion of the data stream, the second portion being newer than the first portion and not including data from the first portion, wherein the second core set is generated using an approach that is one of a mixed gaussian, incremental k-means, streaming k-means++;

predicting future usage of the computing resources based on both the first and second core sets during a time period of overlapping core set usage;

after predicting future usage of the computing resources based on both the first and second core sets, discarding the first core set, wherein the first and second core sets correspond to two different time windows with non-overlapping data;

subsequent to discarding the first core set, predicting future usage of the computing resources is based on the second core set but not the first core set; and displaying the predicted future usage of the computing resources on a graphical user interface (GUI).

9. The non-transitory, computer-readable medium of claim 8, wherein the first and second core sets are each a fixed-size buffer.

10. The non-transitory, computer-readable medium of claim 8, the stages further comprising in response to a user selecting an option on the GUI, adding or removing computing resources from the computing infrastructure.

11. The non-transitory, computer-readable medium of claim 8, the stages further comprising defining at least two clusters of data based on the first core set, the at least two clusters defined by cluster parameters.

12. The non-transitory, computer-readable medium of claim 11, the stages further comprising causing the second core set to inherent the cluster parameters associated with the first core set.

13. The non-transitory, computer-readable medium of claim 11, wherein displaying the predicted future usage comprises displaying a predicted future usage for each of the at least two clusters.

14. The non-transitory, computer-readable medium of claim 11, the stages further comprising displaying, on the GUI, a graphical element allowing a user to select between the at least two clusters for display of the selected cluster and a predicted future usage associated with that cluster.

15. A system for managing resources of a computing infrastructure, comprising:

a memory storage including a non-transitory, computer-readable medium comprising instructions; and a computing device including a hardware-based processor that executes the instructions to carry out stages comprising:

receiving a data stream associated with computing resources of the computing infrastructure;

generating a first core set for a forecasting model using a first portion of the data stream, wherein the first core set holds a fixed number of data points;

predicting future usage of the computing resources based on the first core set;

generating a second core set for the forecasting model using a second portion of the data stream, the second portion being newer than the first portion and not including data from the first portion, wherein the second core set holds the same fixed number of data points, wherein the second core set is generated using an approach that is one of a mixed gaussian, incremental k-means, streaming k-means++;

predicting future usage of the computing resources based on both the first and second core sets when the predicting occurs during a time period of overlapping core set usage, wherein the first and second core sets correspond to two different time windows with non-overlapping data;

after a predetermined time period has elapsed, discarding the first core set;

predicting future usage of the computing resources based on the second core set but not the first core set; and displaying the predicted future usage of the computing resources on a graphical user interface (GUI).

16. The system of claim 15, the stages further comprising in response to a user selecting an option on the GUI, adding or removing computing resources from the computing infrastructure.

17. The system of claim 15, the stages further comprising defining at least two clusters of data based on the first core set, the at least two clusters defined by cluster parameters.

18. The system of claim 17, the stages further comprising causing the second core set to inherent the cluster parameters associated with the first core set.

19. The system of claim 17, wherein displaying the predicted future usage comprises displaying a predicted future usage for each of the at least two clusters.

20. The system of claim 17, the stages further comprising displaying, on the GUI, a graphical element allowing a user to select between the at least two clusters for display of the selected cluster and a predicted future usage associated with that cluster.

\* \* \* \* \*